Patented Sept. 1, 1936

2,052,607

UNITED STATES PATENT OFFICE 2,052,607

RUBBER COMPOUNDING MATERIAL AND METHOD OF USING

Arthur B. Cowdery, Needham, Mass., assignor to The Barrett Company, New York, N. Y., a corporation of New Jersey No Drawing. Application September 13, 1933, Serial No. 689,261

8 Claims. (Cl. 106—23)

This invention is directed to improvements in materials for use in rubber compounding and is especially directed to a new composition of matter which may be employed in such processes, and to the method of using the composition.

As is well known, many materials have been added to rubber as fillers; most of the materials added serve this purpose only. Carbon fillers, however, not only serve as fillers but also serve to increase the strength of the final rubber product. Carbon has been used in rubber compounding in many forms; for example, as lamp black and as pitch. The pitches, in addition to supplying carbon to the rubber compound, also act as softeners for it.

In my prior U. S. Patent 1,820,444 there is disclosed a product of this latter nature. The product disclosed in that patent is obtained from coal tar having a free carbon content of at least 20 per cent, by distilling the tar until 25 to 30 per cent of the volatile matter has been removed, whereupon a pitch residue containing 40 per cent or more of the carbonaceous material is obtained. Carbon supplied in this form appears to be especially satisfactory as a filling material. This may be due to the colloidal or dispersed character of carbon particles present in the product.

Many pitch products have been found to be satisfactory materials for use in the compounding of rubber. These products, however, are in general subject to certain disadvantages. Such products are frequently rather friable and consequently when they are mixed with rubber by the common processes as by milling of the pitch, as flakes or lumps, together with the other ingredients of the rubber mix, the particles of the pitch tend to scatter or fly from the mixture during the mixing operation. Furthermore, the physical properties of these products are such that at times they may tend to stick during milling and hence may not be manipulated as satisfactorily as is desirable.

It is an object of the present invention to overcome the disadvantages of such substances and to produce a new product which is more satisfactory for rubber compounding than those of the prior art. The compositions of matter prepared in accordance with the present invention are less friable and are more readily mixed than prior known materials, yet possess in a high degree the desirable properties of such products.

The products of the present invention are especially suitable for use with reclaimed rubber and when so used impart to the products improved calendering and tubing properties.

According to the present invention pitch is blended with a material which reduces its friability, prevents scattering during milling, and renders it more suitable for rubber compounding. Materials which are ordinarily used as softeners in the compounding of rubber have been found satisfactory for this purpose. Aliphatic compounds having a lubricating or waxy nature are in general suitable for accomplishing the desired results. A large number of such lubricants or waxes have been found to be very efficient softening materials, in particular, high molecular weight aliphatic compounds. My invention in particular contemplates the addition of such materials to a high free carbon pitch such as that described in my Patent No. 1,820,444.

Compounds such as high boiling paraffins, for instance paraffin, ceresin, or petrolatum, may be used with particular advantage for the purpose of softening the pitch product. Such compounds are preferably added to the pitch product in small proportions, such as 5 per cent or 10 per cent, and when so used, satisfactorily effect the softening of the product. The compounding of the resultant material with rubber may be effected smoothly and at lower temperatures than with prior similar compounding materials.

The higher fatty acids or derivatives thereof have also been found to constitute very satisfactory softeners for the pitch products and these compounds, when blended with pitch, give to the pitch especially desirable properties.

A high free-carbon pitch such as that described in my U. S. Patent No. 1,820,444 may be blended with the higher fatty acid compound in such proportions that the resulting product constitutes an exceedingly desirable composition for rubber compounding. A large number of the higher acids and alcohols and their derivatives, of a lubricating or waxy nature, are available for addition to the pitch product. As examples of high molecular weight aliphatic acid softening agents may be mentioned, stearic acid, oleic acid, and other similar acids or their derivatives, such as Montan wax. In general many of the higher fatty acids and related compounds blend satisfactorily with these pitch products and such of these materials that of themselves possess an oily or a soft, greasy or waxy nature are suitable for use in my new composition of matter.

The proportions in which a softening material or plasticizer may be added to the pitch may vary to a consideragble extent; in general from 5 per cent to 10 per cent produces a satisfactory product although this amount may be increased or decreased above or below these values in some cases. As little as 2 or 3 per cent may in many cases produce a product of notably improved properties.

As an example of a product which constitutes one of the preferred embodiments of my invention, a pitch product having a melting point of about 220°–230° F. is prepared by distilling a coal tar containing at least 20 per cent of "free carbon", i. e., matter insoluble in hot benzene or toluene, for about 12 hours or until about 20 per cent to 30 per cent by weight of the volatile matter has been removed, whereupon a residue or pitch is obtained which contains at least 40% "free carbon", i. e., constituents formed in situ and insoluble in benzene, whether elemental carbon or a mixture thereof with high molecular weight hydrocarbons or other carbon compounds. The product has a specific gravity of about 1.3, is free from air and moisture, and contains no appreciable ash-forming constituents.

The product thus prepared is heated to a temperature slightly above its melting point, 5 per cent by weight of stearic acid is added, and the mixture stirred until a uniform blend is obtained. The blended product may then be cooled and ground or flaked as desired.

The product prepared in the above manner will have a melting point of around 215° to 225° F. It is especially adapted for the compounding of rubber and may be used in the same manner as the compositions of my prior patent. However, when so used, it is not subject to the disadvantages of friability and stickiness of prior similar products. It mixes readily, and mills smoothly and uniformly without flying, or sticking to the rolls of the mill. The stearic acid present is also beneficial in the curing of rubber mixes prepared from the product in that it "stabilizes" the curing. Various rubbers have correspondingly varied curing times. The addition to a rubber mix of 0.75% stearic acid (based on the weight of rubber present) brings the curing times for various rubbers within narrow limits. It also improves the efficiency of many accelerators, e. g., mercaptobenzothiazole.

When the composition prepared according to my invention is used in the same manner as the prior known pitch compositions, rubber products of equal or superior properties may be obtained.

Instead of preparing the new products in the manner described, any other suitable blending process may be employed.

The addition of plasticizers according to my invention usually results in a slight lowering of the melting point, say 5–10° or 15° F. and consequently a pitch product should be selected which has a melting point somewhat higher than that desired for the blended product. This variation of course depends on both the proportion and the identity of the plasticizer employed. Preferably I select a pitch such that the blended product will have a melting point of from about 215° to about 225° F.

As illustrative of the use of my composition in rubber compounding, the following examples of the incorporation of the material in rubber mixes are given.

*Example I.*—A suitable composition is as follows, parts being by weight:

| | |
|---|---|
| Smoked sheets | 23.00 |
| Rubber reclaims | 38.75 |
| Carbon black | 25.00 |
| Pitch-stearic acid composition prepared as above | 15.00 |
| Zinc oxide | 5.15 |
| Neozone {50% Phenylalphanaphthylamine, 25% Metatoluylenediamine, 25% Stearic acid} | .75 |
| Sulfur | 2.00 |
| D. O. T. G. | .60 |
| Total | 110.25 |

The above ingredients being assembled they were milled in the customary manner. The composition exhibited materially less tendency to stick to the milling rolls than such compositions employing pitch without the addition of a softening material. The milled product was then cured for 12 minutes at 60 pounds steam pressure and corresponding temperature. The product possessed the same character as the products without the addition of the softening material and exhibited physical strength superior to that of the latter products.

The following tests on the two products show their comparative physical properties.

A—The product prepared in accordance with the above example.

B—The product prepared in the same manner and with the same materials except that 15 parts of pitch were substituted for the 15 parts of pitch-stearic acid composition of the example.

| | A | B |
|---|---|---|
| Tensile breaking point _____ Pounds__ | 1795 | 1735 |
| Percent elongation _____do____ | 340 | 305 |
| Tear (Winkelmann): | | |
| Longitudinal _____Pounds__ | 36.4 | 35.1 |
| Transverse _____do____ | 38.3 | 27.1 |

*Example II.*—The following ingredients were mixed and cured in a manner similar to Example I:

C—Pitch

D—Blend of 95% pitch (by weight) and 5% oleic acid

| | C | D |
|---|---|---|
| Reclaimed rubber | 100.00 | 100.00 |
| Whiting (calcium carbonate) | 50.00 | 50.00 |
| Pitch | 15.00 | |
| Blend of 95% pitch and 5% oleic acid | | 15.00 |
| Zinc oxide | 5.00 | 5.00 |
| Stearic acid | 0.75 | 0.75 |
| Sulfur | 3.00 | 3.00 |
| Mercaptobenzothiazole | 0.25 | 0.25 |
| Total | 174.00 | 174.00 |

The following are the results of tests on these products:

| | Pounds | Pounds |
|---|---|---|
| Tensile—breaking point | 640 | 670 |
| Percent elongation | 280 | 310 |

*Example III.*—The following ingredients were mixed and cured in a manner similar to Example I:

E—Pitch

F—Blend of 90 parts of pitch (by weight) and 5 parts of paraffin.

| | E | F |
|---|---|---|
| Reclaimed rubber | 100.00 | 100.00 |
| Whiting (calcium carbonate) | 50.00 | 50.00 |
| Pitch | 10.00 | |
| Blend of 90 parts pitch and 5 parts paraffin | | 10.00 |
| Lime | 2.00 | 2.00 |
| Sulfur | 3.00 | 3.00 |
| Diphenylguanidine | 0.5 | 0.5 |
| Total | 165.5 | 165.5 |

The following are the results of tests on these products:

| | Pounds | Pounds |
|---|---|---|
| Tensile—breaking point | 590 | 620 |
| Percent elongation | 140 | 150 |

Not only are the milling properties of pitch-containing rubber mixes thus improved but the physical properties of the products may also be improved. Other methods of preparation and use of course may be employed instead of the method outlined in the examples. The pitch composition may comprise another softening material or a plurality of softening materials.

I find, that by including in my product a high molecular fatty acid compound such as stearic acid not only is the pitch rendered less friable but such an addition further advantageously affects the milling properties of the resultant product, improves dispersion, prevents sticking, and reduces the temperature during the milling. The milling of rubber reclaims is especially facilitated by employing the product of my invention. Also I find that stearic acid produces a composition which is exceptionally stable, no deleterious change being observed on long standing. Consequently the preferred embodiment of my invention comprises stearic acid in combination with a pitch, which may advantageously be a high free-carbon pitch, the preparation of which I have described above. I find this to be the most satisfactory of the compositions that I have prepared.

The term "blended" is used in the claims to indicate that the softening materials are not merely mechanically mixed with the coal tar pitch composition but are so dispersed therein as to alter the physical properties of the pitch, rendering it less friable and thus reducing its tendency to scatter during milling.

In the appended claims where reference is made to benzol insoluble constituents of the coal tar distillation residue which have been produced in situ, I mean those constituents commonly known as "free carbon" which have been formed in the material during the reactions by which the material is produced as distinguished from free carbon extraneously formed and added to the material.

I claim:

1. In the compounding of rubber with coal tar pitch, the method which comprises blending the coal tar pitch with a high molecular weight aliphatic softening agent and thereafter mixing the resultant blend with rubber to be compounded therewith and milling the mixture.

2. In the compounding of rubber with coal tar pitch of high free carbon content, the method which comprises blending the coal tar pitch with a minor proportion of a high molecular weight aliphatic acid softening agent, thereafter mixing the resultant blend with rubber to be compounded therewith, and milling the mixture.

3. In the compounding of rubber with coal tar pitch, the method which comprises blending the coal tar pitch with stearic acid, thereafter mixing the resultant blend with rubber to be compounded therewith, and milling the mixture.

4. In the compounding of rubber with a coal tar pitch having not less than about 40% by weight of constituents which have been produced in situ and which are insoluble in benzene, said material having a melting point around 220° F., the method which comprises melting the coal tar pitch and blending between about 2% and about 10% of stearic acid therewith, freezing the blended product, and thereafter milling the resultant blend with rubber.

5. A rubber compounding material comprising a major proportion of coal tar pitch containing free carbon and a minor proportion of a high molecular weight aliphatic softening agent, obtained by melting the coal tar pitch, blending the softening agent with the melted pitch, and cooling to produce a uniformly blended solid product.

6. A rubber compounding material comprising from about 90% to about 98% coal tar pitch and from about 2% to about 10% of a high molecular weight aliphatic softening agent blended therewith.

7. A rubber compounding material comprising from about 90% to about 98% coal tar pitch and from about 2% to about 10% of stearic acid blended therewith.

8. A rubber compounding material comprising from about 90% to about 98% coal tar pitch of high free carbon content and from about 2% to about 10% of a high molecular weight aliphatic acid softening agent blended therewith.

ARTHUR B. COWDERY.